United States Patent [19]

Poetsch et al.

[11] 4,281,351
[45] Jul. 28, 1981

[54] APPARATUS FOR THE LINE BY LINE OPTICAL SCANNING OF A FILM

[75] Inventors: Dieter Poetsch, Darmstadt; Werner Becker, Mainz; Ottokar Klein, Weiterstadt; Rudolf Wulf, Riedstadt, all of Fed. Rep. of Germany

[73] Assignee: Robert Bosch GmbH, Stuttgart, Fed. Rep. of Germany

[21] Appl. No.: 77,985

[22] Filed: Sep. 24, 1979

[30] Foreign Application Priority Data

Sep. 28, 1978 [DE] Fed. Rep. of Germany ....... 2842218

[51] Int. Cl.³ .............................................. H04N 3/36
[52] U.S. Cl. ...................................... 358/214; 358/54
[58] Field of Search ................... 358/214, 215, 216, 6, 358/8, 54, 130; 352/223, 224, 183, 166, 105, 228; 226/189, 190, 168

[56] References Cited

U.S. PATENT DOCUMENTS

| | | | |
|---|---|---|---|
| 858,612 | 7/1907 | Mason | 226/189 |
| 1,404,773 | 1/1922 | Hunt | 352/224 |
| 1,437,895 | 12/1922 | Horst | 352/223 |
| 1,936,205 | 11/1933 | Owens | 226/189 |
| 2,868,070 | 1/1959 | O'Brien | 352/228 |
| 3,469,917 | 9/1969 | Pignone | 352/183 |
| 3,586,229 | 6/1971 | Kamada | 226/189 |
| 3,833,756 | 9/1974 | Kumagai | 358/54 |
| 4,149,191 | 4/1979 | Longchamp | 358/214 |

*Primary Examiner*—Marc E. Bookbinder
*Assistant Examiner*—Michael A. Masinick
*Attorney, Agent, or Firm*—Frishauf, Holtz, Goodman & Woodward

[57] ABSTRACT

For the line-by-line optical scanning of a film as it passes at high speed through a scanning region, particularly to obtain television image signals, a light source directs light to a sensor. To reduce friction of the film adjacent the scanning region, two rollers or endless belts support the film at positions on the film outside the film frames. These rollers or belts replace the previously usual stationary film guide shoes adjacent the film gate. Lateral guidance of the film can be provided by rollers.

14 Claims, 13 Drawing Figures

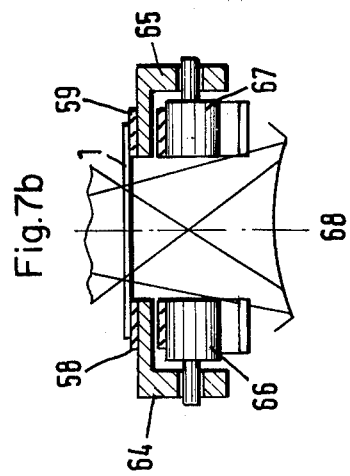
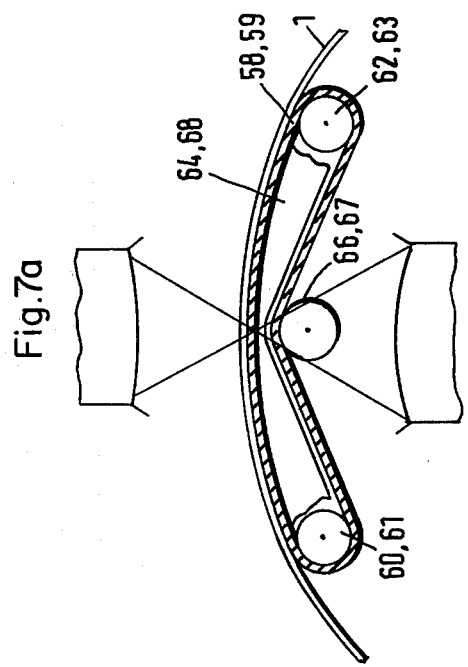

APPARATUS FOR THE LINE BY LINE OPTICAL SCANNING OF A FILM

BACKGROUND OF THE INVENTION

The present invention relates to apparatus for scanning a film for either projection or recording or transmission in a different form, e.g. as a television picture.

BACKGROND AND PRIOR ART

Arrangements are already known in which the film is moved between a light source and a sensor, for example a scanning tube or a photo cell. With these arrangements, as is usual with film projectors, the film is maintained in the plane of focus by a film guide which includes the picture gate and in addition to which the film is urged against the fixed film guide with the aid of spring-loaded shoes. Sliding friction prevailing due to the movement of the film is troublesome especially due to inadmissibly high heating and wear. Thus, during rapid winding or rewinding, the pressure of the shoes must be relieved and the film raised from the film guide which leads, however, to the film being no longer located accurately in the plane of focus.

The co-pending Patent Application Ser. No. 928,783, Poetsch, discloses a system for the television scanning of films in which the film is scanned at a rate independent of the line-by-line television standard, thus permitting scanning of the film at high winding or rewinding speeds; the signals are read into a store and are read out once again in accordance with the particular television standard. With such a system however, it would be necessary to raise the film from the film guide during rapid winding or rewinding and this would be noticeable as lack of definition in the scanned output.

The Invention: It is an object to provide a scanning arrangement in which the film is maintained in the plane of focus independently of the film speed and no relative sliding movement occurs between the film and the film supports.

Briefly, apparatus is used for the optical scanning of a film comprising a light source and a sensor defining therebetween a scanning region and means for moving a film through the scanning region. In accordance with the invention, means for are provided supporting the film at positions on the film outside the film frames, said supporting means being located adjacent the scanning region and having surfaces moving with the film e.g. rollers or belts engaging the edge portions of the film.

The apparatus has the advantage that the film can be scanned with the required degree of sharpness independently of the speed of the film and moreover is also protected due to the lack of any sliding friction.

It is of particular advantage to provide two further rollers for the lateral guiding of the film of which one is pressed resiliently against one edge of the film.

BRIEF DESCRIPTION OF THE DRAWINGS

FIG. 2a is a schematic view of an embodiment provided with inclined rollers;

FIG. 2b is a part-phantom, part-schematic front view of FIG. 2a;

FIG. 2c is a fragmentary side view of FIG. 2a;

FIG. 5b is a schematic side view of FIG. 5a;

FIG. 7a shows partly in section an arrangement in which the film runs on belts;

FIG. 7b is a part-sectional end view of FIG. 7a; and

DESCRIPTION OF THE PREFERRED EMBODIMENTS

The embodiments to be described all allow high speed scanning of a film to take place by providing a novel film locating and guiding arrangement.

Figure 1:
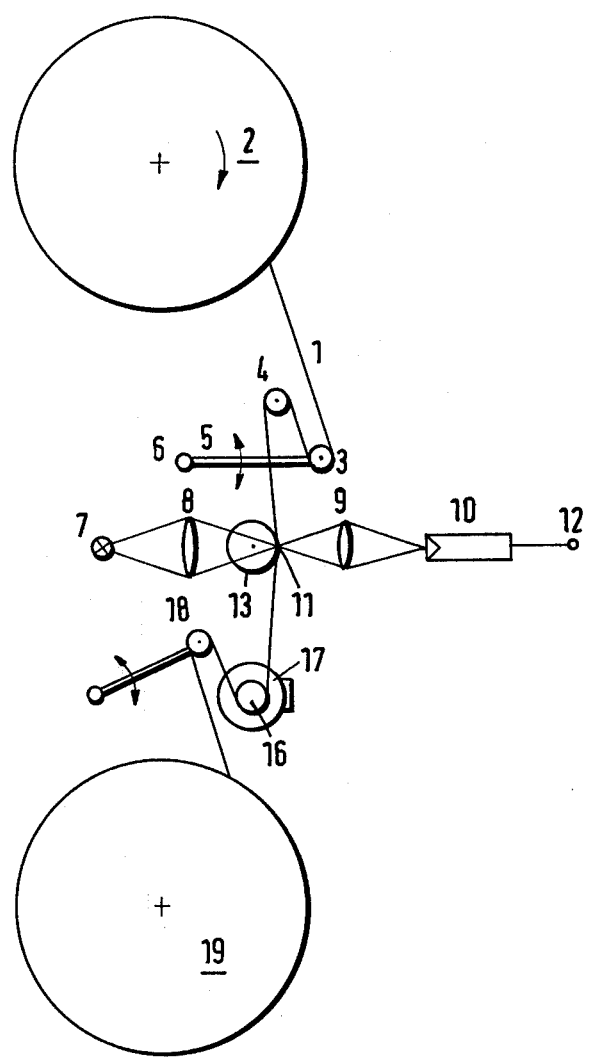
FIG. 1 shows a film-drive mechanism provided with the arrangement in accordance with the invention.

In the arrangement according to FIG. 1, a film 1 is unwound from a storage roll 2 and is guided over a compensating roller 3 and a reversing roller 4. The compensating roller 3 is arranged on a lever 5 which is pivotable about a point 6 so that the film can be accelerated relatively rapidly in the region of the scanning device, without having to accelerate the large mass of the film spools and wound film as rapidly. In known manner, the film is scanned line by line at a region 11 with the aid of a light source 7, a condensor lens arrangement 8, an objective lens arrangement 9 and a sensor 10. The output signals from the sensor 10 can be extracted at 12 and can be amplified.

In accordance with the invention, film 1 is engaged by two rollers, positioned at marginal strips of the film at the region 11, of which only the roller 13 is illustrated in FIG. 1. A light beam 15 (FIG. 2) passes between the rollers. For the sake of clarity, lateral guidance, as is explained with reference to FIG. 2, is not illustrated in the arrangement of FIG. 1.

A capstan roller 16, which is driven by a motor 17, is used to drive the film 1 and hence the film is looped around the roller 16. Finally, the film arrives at a winding up spool 19 over a further compensating roller 18 which is movable in a similar manner to the roller 4. In the region 11 the film conforms to a portion of the outer surfaces of the rollers 13, 14 so that it lies in the plane of focus of the scanning means.

Further parts such as, for example, a base plate on which the described elements are arranged and a driving motor for the film spools and the electronic circuits associated therewith are not necessary for the understanding of the present invention and are, therefore, not illustrated further. Furthermore, reference is made to the fact that the scanning arrangement in accordance with the invention is obviously also suitable for the purpose of colour television wherein the sensor 10 is appropriately designed in the usual manner with a colour separator and a sensor for each of the basic colours, red, green and blue. The actual scanning apparatus is also not disclosed as it is considered known to those skilled in the art.

Figure 2:
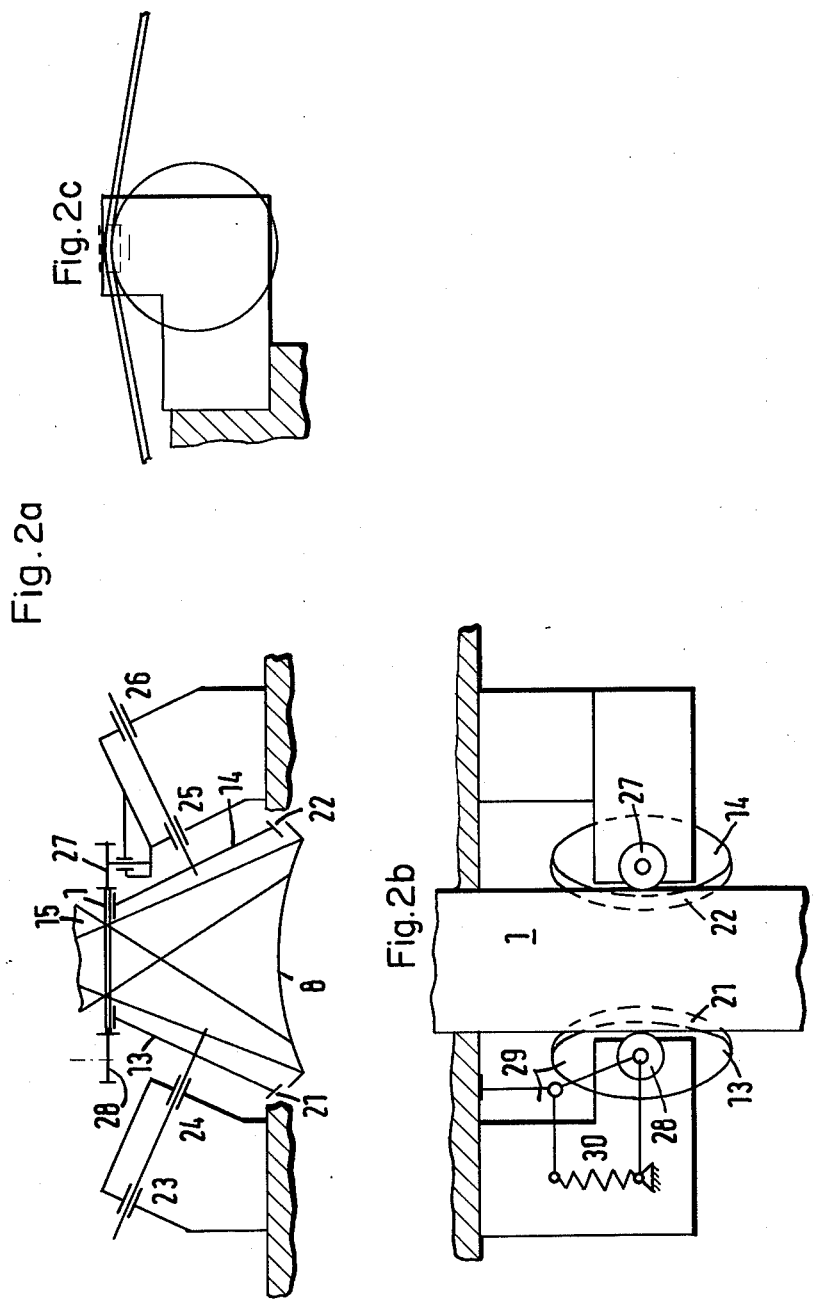

FIG. 2 likewise shows diagrammatically an embodiment of the invention in which the rollers are arranged at an inclination with respect to the film plane in order to provide sufficient space for the light beam 15 between the rollers. Indeed, in the arrangement according to FIG. 2, the light beam passes from a source (not shown) through a condensor 8, of which only the exit surface is illustrated, through the film 1. The rollers 13 and 14 each have a frusto-conical outer surface 21 and 22 which engage the film 1 at its edges outside the film frames. The axes of the rollers 13 and 14 are rotatably mounted at 23, 24, 25 and 26. The distance of the rollers from one another and the width of their outer surfaces are so selected that the film 1 slightly overhangs the outer surfaces. Two further rollers 27 and 28 with axes of rotation perpendicular to the film plane are provided for lateral guidance of the film 1. The axis of the roller 27 is arranged at a fixed location whereas the bearing for the roller 28 is biased against the edge of the film 1 with the aid of a lever 29 and a spring 30 so that the film 1 is always pressed against the roller 27 and is thus laterally guided without clearance but does not jam on slight lateral movement of the film.

Figure 3:
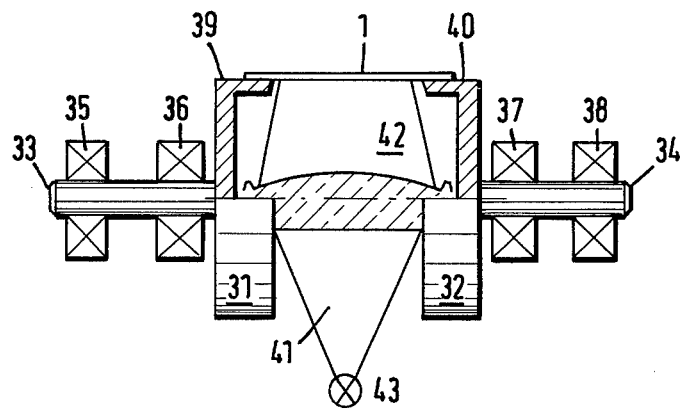
FIG. 3 shows an embodiment in which the rollers are arranged parallel and are each disposed on one axis.

FIG. 3 shows an embodiment in which the two rollers 31 and 32 are arranged on the same axis but on separate shafts 33, 34. The shafts 33 and 34 are mounted in bearings 35, 36, 37 and 38. Each of the rollers 31 and 32 are formed of discs provided with axially extending flanges providing the film engaging outer surfaces 39 and 40, which flanges project towards each other so that sufficient room for the path of the beam 41 and for accommodating the condenser 42 is available between the rollers 31 and 32. In the embodiment according to FIG. 3, the optical arrangement is so designed that the condenser 42 and the light source 43 is arranged on the side of the film facing the rollers. Basically, this arrangement could also be designed so that the objective and the sensor are arranged on the side of the film facing the rollers. However, since higher requirements are placed on the objective than on the condenser 42 and it consists, therefore, of a plurality of individual lenses, the solution first referred to is to be preferred for constructional reasons.

Figure 4A:
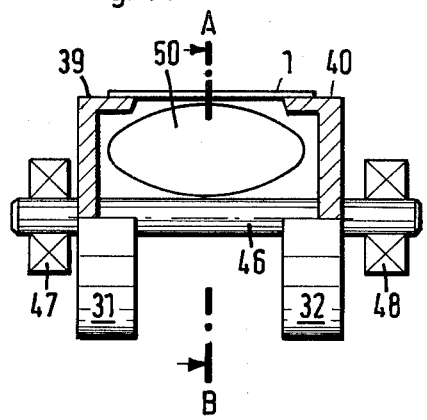
FIG. 4a shows part front and a sectional end view of an embodiment comprising rollers arranged in parallel on one axis.
Figure 4B:
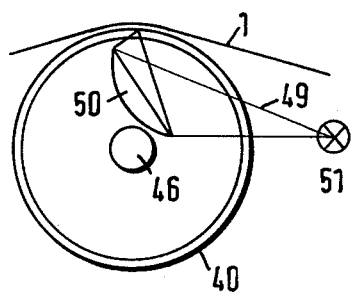
FIG. 4b is a side view of FIG. 4a, looking along line A-B.

A further embodiment is illustrated in FIG. 4. In this instance, the same rollers 31, 32 are used as in the embodiment according to FIG. 3. However, they are arranged on a common shaft 46 which is once again rotatably mounted in the bearings 47, 48. Since, with the arrangement according to FIG. 4, the shaft 46 prevents direct passage of the light beam 49, a reflecting device in the form of a concave mirror 50 is arranged between the rollers 31, 32, which reflects light originating from a light source 51 and at the same time serves as a condenser.

Figure 5A:
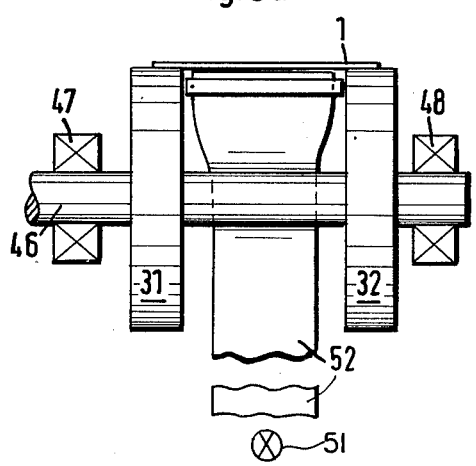
FIG. 5a shows a front view of an arrangement in which the light required for scanning is transmitted with the aid of glass fibres.
Figure 5B:
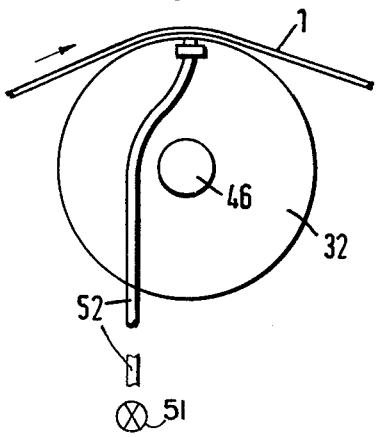

A further possibility for supplying the light required for the scanning is illustrated in FIG. 5. The rollers 31, 32, the shaft 46 and the bearings 47, 48 are arranged as in FIG. 4. The light is conducted from the light source 51 through a bundle of glass optical fibres 52.

Figure 6:
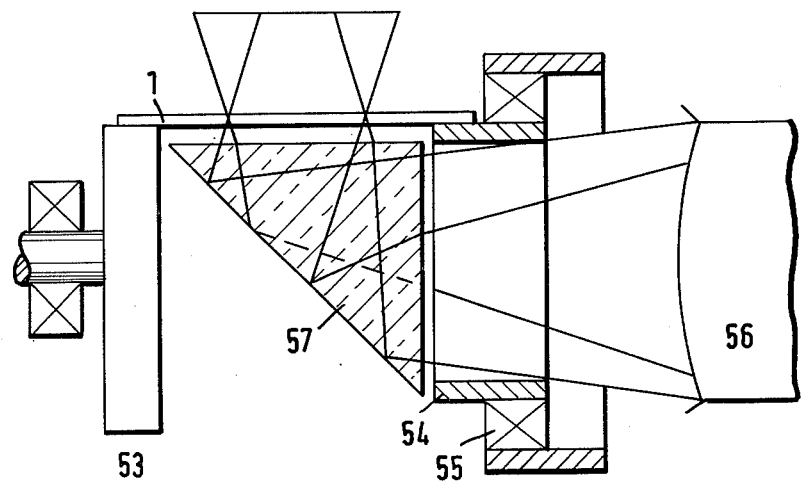
FIG. 6 shows an arrangement in which a deflecting prism is arranged between the rollers.

A further possibility for conveying the light beam to the film without vignetting, although only a limited intermediate space is available between the rollers, is illustrated in FIG. 6. Whereas one of the rollers, in this case the roller 53, has no peculiarities and is mounted on one side, the other roller consists of a sleeve 54 which is arranged to run within a ball bearing 55. The light beam can pass from a condenser 56 through the sleeve 54 unhindered and is deflected by the prism 57 on to the film 1.

FIG. 7 shows two views of a further embodiment in which the rollers are replaced by two belt loops 58, 59, which engage the film 1 near its edges by way of its perforations. The belts are guided over rollers 60, 61, 62, 63. In order to guide the film accurately in the direction of the optical axis, guiding parts 64 and 65 are provided on which the belts 58 and 59 slide. In the embodiment shown in FIG. 7, two further rollers 66, 67 are provided in order to make it possible for the condensor 68 to be arranged as near as possible to the film 1.

Figure 8:
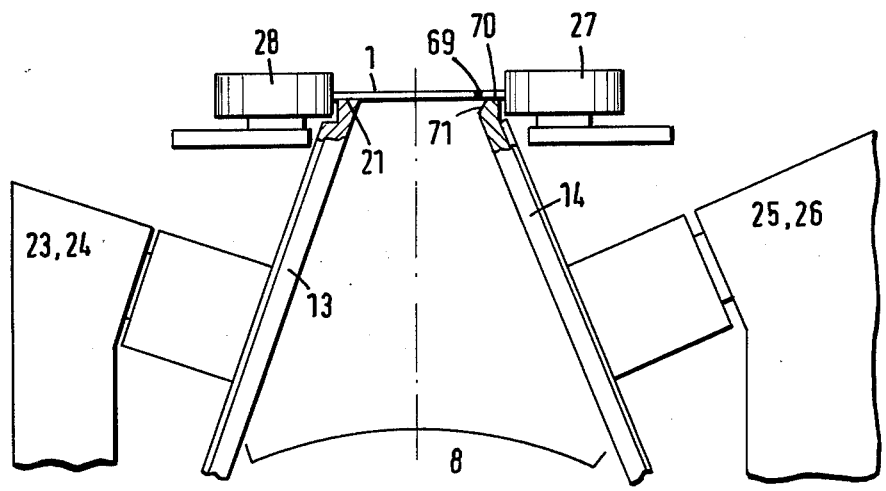
FIG. 8 shows a further representation of the embodiment shown in FIG. 2.

FIG. 8 shows an enlarged representation of the embodiment according to FIG. 2 and a further feature. The corresponding parts are provided with the same references as in FIG. 2. In order to prevent damaging the sound track 69 of the film 1 the area of the outer surface of the roller 14 is reduced as compared with the outer surface 21 of roller 13 so that only a portion 70 of the outer surface of roller 14 carries the film. The outer surface 21 of the roller 13 is in engagement with the other marginal strip of the film. The size of the portion 70 is determined by the width of the film between the edge of the sound track and the edge of the film. A portion 71 forming an obtuse angle with the said portion 70 of the outer surface is not normally in contact with the film 1. However, should the edge of the film 1 supported by the portion 70 of the roller 14 be damaged, then the film is prevented from falling between the rollers 13, 14 by the portion 71 of the outer surface of the roller 14 and as soon as the damaged portion of the film has passed due to the motion of the film, the film rides up the portion 71 to bring it once again into the original position.

What is claimed is:

1. In the art of converting the image content of motion picture film, having image frames and marginal portions, to television image signals,
   apparatus for the optical scanning of the film frames having
   a light source (7, 51);
   means (8, 42, 50) in the path of the light from the source for furnishing a beam of light and for directing said beam to the frames of the film;
   a sensor (10) receiving the beam of light after having passed through the frame, the region between the beam furnishing means and the sensor defining a scanning region;
   and means for moving the film through the scanning region, and comprising
   means for guiding the film in a predetermined curved path through said scanning region including
   means for supporting the film at said marginal portions and outside of the flim frames, located adjacent the scanning region, and having convex surfaces facing the film, moving with the film, and engaging the film at one side thereof;
   and rotating film guide means (3, 4, 26, 28) guiding the film in the curved path over said convex movable surface support means positioned remotely from said scanning region.

2. Apparatus according to claim 1 wherein the supporting means comprises at least two rollers (13, 14) and having outer surfaces positioned in engagement with at least part of the marginal portions of the film.

3. Apparatus according to claim 2 wherein each of the two rollers (13, 14) is located on a shaft, the light beam passing between the rollers.

4. Apparatus according to claim 3 wherein the outer surfaces (21, 22) of the rollers (13, 14) are conical, said rollers having planes of rotation which form an obtuse angle converging towards the film (1) to provide an enlarged distance between the rollers at circumferential regions remote from the film.

5. Apparatus according to claim 2 wherein each of the rollers (31,32) is formed as a disc with an axially extending flange at its periphery, said flanges extending towards one another.

6. Apparatus according to claim 5 wherein each of the rollers (31,32) is located on a shaft (33,34), and the light source (43) is arranged on the side of the rollers (31,32) remote from the film and a condenser lens arrangement (42) is arranged between the rollers (31,32).

7. Apparatus according to claim 5 wherein the rollers (31,32) are arranged on a common shaft (46) and that a condenser lens arrangement (50) in the form of a concave mirror is arranged in the space between the rollers (31,32).

8. Apparatus according to claim 5 wherein the rollers (31,32) are arranged on a common shaft (46) and that the light necessary for scanning is conveyed between the rollers by light conducting optical fibres (52).

9. Apparatus according to claim 1 further comprising two lateral guide rollers (27, 28) positioned laterally adjacent the marginal portions of the film for lateral guidance of the film, one of which is resiliently pressed against the respective edge of the film.

10. Apparatus according to claim 9 wherein the axes of rotation of the further rollers (27,28) are arranged substantially parallel to the optical axis.

11. Apparatus according to claim 1 wherein the supporting means comprises two parallel belts (58,59), the spacing of which is at least equal to the width of the film frames and which are looped around at least two rollers (60,61,62,63), and two guiding parts (64,65) which so guide the belts at the locations at which the belts are in contact with the film, that the belts form extended surfaces moving with the film.

12. Apparatus according to claim 2 wherein one of the rollers (53,54) is formed by a rotatably mounted sleeve (54) having a bore therethrough, and wherein a deflecting mirror or deflecting prism (57) is provided, arranged in the intermediate space between the rollers, the light beam being guided substantially axially parallel to the bore of the sleeve (54).

13. Apparatus for use with film having a sound track on one of the marginal portions, according to claim 2 wherein the outer surface of one (14) of rhe rollers (13, 14, 31, 32) comprises two portions (70, 71) of which one portion (70) is in contact with the film (1) and the other portion (71) faces the film in the region of the sound track (69) of the film (1) and forms an acute angle with the film (1).

14. Apparatus according to claim 1, further including light conducting fibers (52) transmitting light from said source to the scanning region and, at least in part, guiding said beam of light.

* * * * *